(12) United States Patent
Katagiri

(10) Patent No.: US 11,780,527 B2
(45) Date of Patent: Oct. 10, 2023

(54) STRADDLE-TYPE VEHICLE

(71) Applicant: HONDA MOTOR CO., LTD., Tokyo (JP)

(72) Inventor: Kiyoshi Katagiri, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 40 days.

(21) Appl. No.: 17/181,654

(22) Filed: Feb. 22, 2021

(65) Prior Publication Data

US 2021/0291929 A1    Sep. 23, 2021

(30) Foreign Application Priority Data

Mar. 18, 2020  (JP) ................................ 2020-047241

(51) Int. Cl.
| | |
|---|---|
| *B62K 19/40* | (2006.01) |
| *B62K 19/32* | (2006.01) |
| *B62J 9/21* | (2020.01) |
| *B62K 21/12* | (2006.01) |
| *B62K 21/02* | (2006.01) |

(52) U.S. Cl.
CPC ............... *B62K 19/40* (2013.01); *B62J 9/21* (2020.02); *B62K 19/32* (2013.01); *B62K 21/02* (2013.01); *B62K 21/12* (2013.01)

(58) Field of Classification Search
CPC ..... B62K 19/40; B62J 9/20; B62J 9/21; B62J 9/24; B62J 9/40; B62J 11/22; B62J 7/00
USPC ....... 224/412, 413, 419, 420, 421, 423, 424, 224/426, 428–431, 435, 441, 447, 449; 280/202
See application file for complete search history.

(56) References Cited

U.S. PATENT DOCUMENTS 3,938,719 A * 2/1976 Carlton .................... B62J 7/02
                                                                      224/438
4,402,439 A * 9/1983 Brown ...................... B62J 9/27
                                                                      224/438
(Continued)

FOREIGN PATENT DOCUMENTS

CA     1192529 A  * 8/1985  ............... B62J 9/00
DE     4438465 A1 * 5/1996  ............. B62J 9/003
(Continued)

OTHER PUBLICATIONS

FR 442561 English Translation of Description Retrieved from Espacenet (Dec. 2022) (Year: 2022).*
(Continued)

*Primary Examiner* — Jacob D Knutson
(74) *Attorney, Agent, or Firm* — Paratus Law Group, PLLC

(57) ABSTRACT

A straddle-type vehicle including a vehicle body frame to which a steering unit that supports a front wheel in a steerable manner and a stay to which a storage box is configured to be attached are attached. The vehicle body frame is provided with a head tube. The steering unit includes a steering stem rotatably penetrating the head tube, and a pair of left and right front fork tubes coupled to the steering stem and extending toward an axle of the front wheel. The pair of left and right front fork tubes pivotally supports the axle of the front wheel. The stay is located on an outer side of the front fork tubes in the vehicle width direction, and intersects with at least one of the steering stem and the front fork tubes in a side view.

7 Claims, 4 Drawing Sheets

(56) References Cited

U.S. PATENT DOCUMENTS

| | | | | |
|---|---|---|---|---|
| 4,460,115 A | * | 7/1984 | Jackson | B62J 9/21 224/438 |
| 4,487,344 A | * | 12/1984 | Blackburn | B62J 9/24 224/430 |
| 4,491,258 A | * | 1/1985 | Jones | A45F 4/02 224/153 |
| 4,813,583 A | * | 3/1989 | Carpenter | B62J 7/00 224/452 |
| 5,810,230 A | * | 9/1998 | Nutto | B62J 7/04 224/430 |
| 6,053,384 A | * | 4/2000 | Bachman | B62J 9/27 224/430 |
| 6,227,426 B1 | * | 5/2001 | Martin | B62J 9/21 224/442 |
| 6,830,169 B1 | * | 12/2004 | Campbell | B62J 7/08 224/450 |
| 2005/0072823 A1 | * | 4/2005 | Boehmke | B62J 9/21 224/420 |
| 2014/0291365 A1 | * | 10/2014 | Christini | B62J 7/08 224/401 |
| 2014/0312085 A1 | * | 10/2014 | Spillane | B62J 11/00 224/412 |
| 2016/0244115 A1 | | 8/2016 | Warren | |

FOREIGN PATENT DOCUMENTS

| | | | | | |
|---|---|---|---|---|---|
| DE | 102016207239 B3 | | 6/2017 | | |
| EP | 1289826 B1 | * | 8/2004 | | B62J 9/005 |
| FR | 442561 A | * | 9/1912 | | |
| FR | 2105341 A5 | * | 4/1972 | | |
| FR | 2814430 A3 | * | 3/2002 | | B62J 7/06 |
| GB | 190902316 A | * | 10/1909 | | |
| GB | 191208804 A | * | 8/1912 | | |
| GB | 204194 A | * | 9/1923 | | |
| GB | 581403 A | * | 10/1946 | | |
| JP | S30-001418 Y | | 2/1955 | | |
| JP | S60-139684 U | | 9/1985 | | |
| JP | 2002-068052 A | | 3/2002 | | |
| JP | 2010064729 A | * | 3/2010 | | |
| WO | WO-2011093804 A1 | * | 8/2011 | | B62J 9/25 |

OTHER PUBLICATIONS

Oct. 26, 2021, German Search Report issued for related DE Application No. 102021105979.8.

Jun. 6, 2023, Translation of Japanese Office Action issued for related JP Application No. 2020-047241.

* cited by examiner

STRADDLE-TYPE VEHICLE

CROSS-REFERENCE TO RELATED APPLICATION

The present application claims the benefit of priority of Japanese Patent Application No. 2020-047241, filed on Mar. 18, 2020, the content of which is incorporated herein by reference.

TECHNICAL FIELD

The present invention relates to a straddle-type vehicle.

BACKGROUND ART

In related art, there has been a straddle-type vehicle such as a motorcycle in which a storage box can be attached to a side surface of a vehicle body. For example, Patent Literature 1 discloses a straddle-type vehicle in which a storage box can be attached to both left and right sides of a rear portion of a vehicle body.

However, in the straddle-type vehicle of JP2002-068052A, although the storage box can be attached to both left and right sides of the rear portion of the vehicle body, the storage box cannot be attached to outer sides of front fork tubes in a vehicle width direction.

SUMMARY OF INVENTION

The present invention provides a straddle-type vehicle in which a storage box can be attached to outer sides of front fork tubes in a vehicle width direction.

According to an aspect of the present invention, there is provided a straddle-type vehicle including a straddle-type vehicle comprising a vehicle body frame to which a steering unit that supports a front wheel in a steerable manner and a stay to which a storage box is configured to be attached are attached, in which the stay is provided with a stay-side locking portion configured to lock the storage box, the vehicle body frame is provided with a head tube, the steering unit includes a steering stem rotatably penetrating the head tube, and a pair of left and right front fork tubes coupled to the steering stem and extending toward an axle of the front wheel, and the pair of left and right front fork tubes pivotally supports the axle of the front wheel, in which the stay is located on an outer side of the front fork tubes in the vehicle width direction, and intersects with at least one of the steering stem and the front fork tubes in a side view.

According to the present invention, a storage box can be attached to outer sides of a pair of left and right front fork tubes in a vehicle width direction.

DESCRIPTION OF EMBODIMENTS

Figure 1:
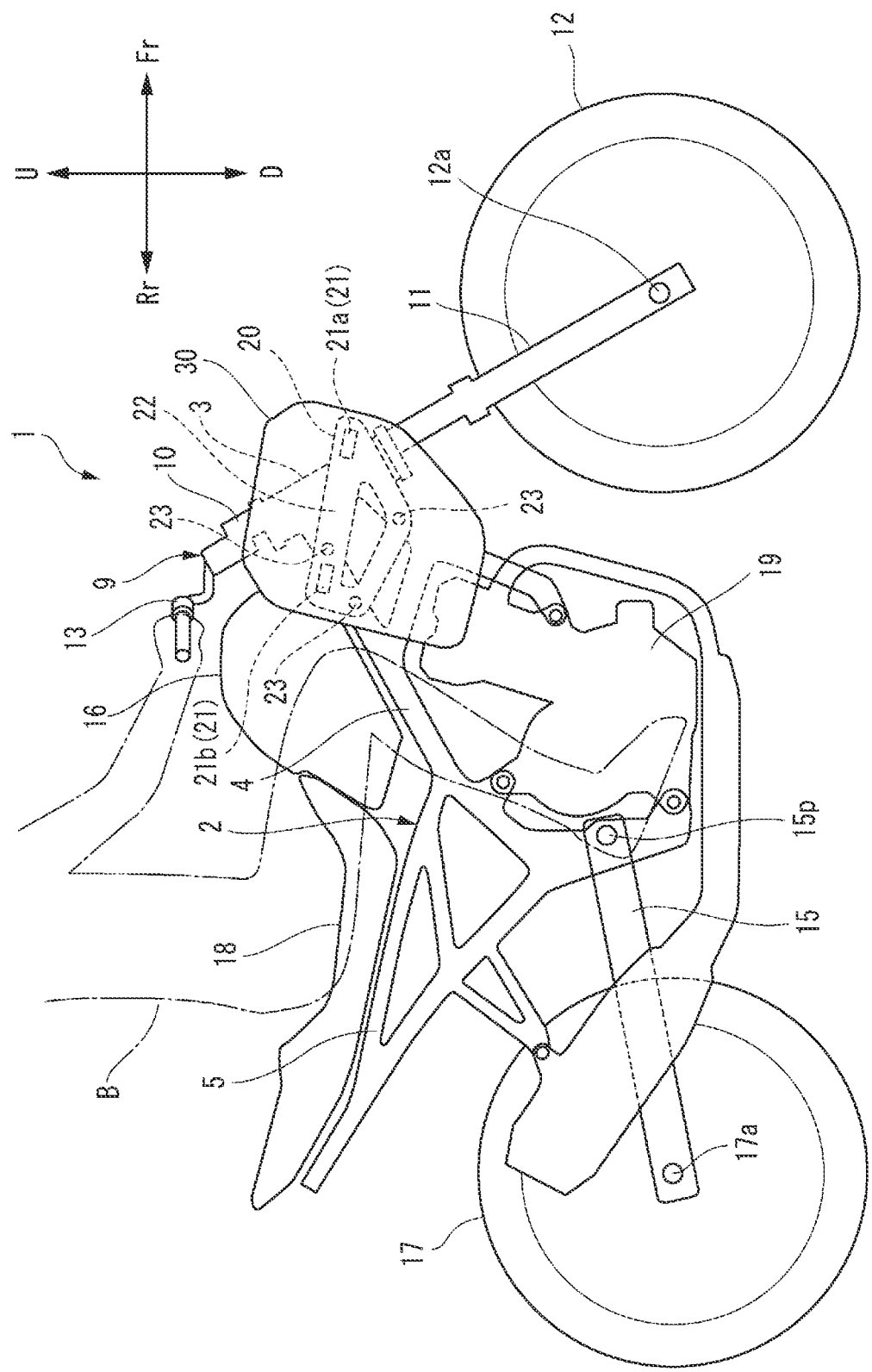
FIG. 1 is a side view of a straddle-type vehicle according to an embodiment of the present invention.

Hereinafter, an embodiment of a straddle-type vehicle of the present invention will be described with reference to the accompanying drawings. In the drawings, a front side of a straddle-type vehicle is denoted by Fr, a rear side by Rr, an upper side by U, a lower side by D, a left side by L, and a right side by R.

Figure 2:
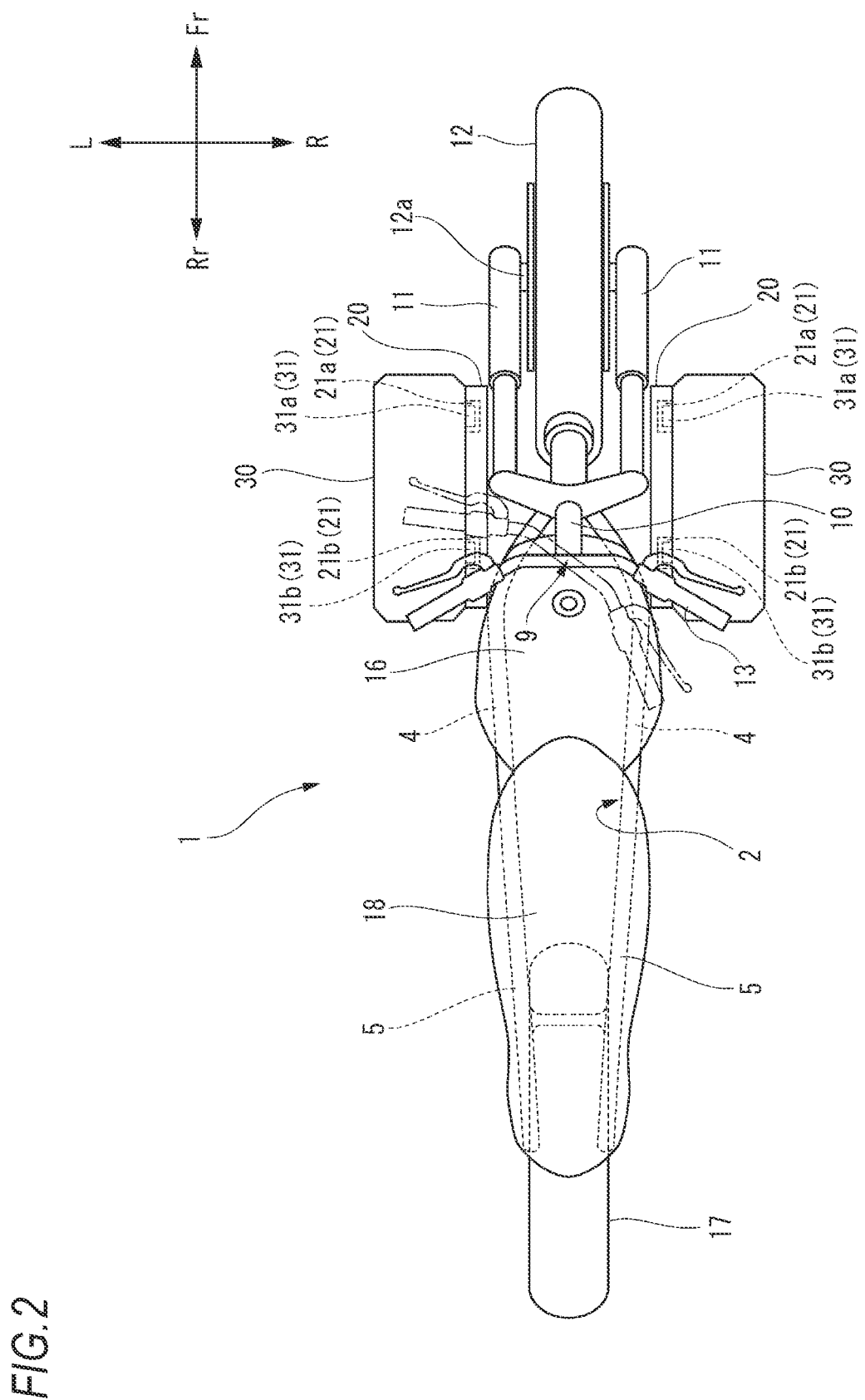
FIG. 2 is a plan view of the straddle-type vehicle shown in FIG. 1 as viewed from above.

As shown in FIGS. 1 and 2, the straddle-type vehicle 1 includes a vehicle body frame 2 constituting a framework of the straddle-type vehicle 1. A steering unit 9 that supports a front wheel 12 in a steerable manner, an engine 19 serving as a driving source of the straddle-type vehicle 1, a double-sided swingarm 15 that supports a rear wheel 17, a riding seat 18 for a rider to sit on in a straddling manner, and stays 20 to each of which a storage box 30 can be attached in a detachable manner are attached to the vehicle body frame 2.

The vehicle body frame 2 includes a main frame 4 whose front end portion is provided with a head tube 3 extending frontward and downward, and a pair of left and right rear frames 5 extending rearward and upward from the main frame 4. The main frame 4 extends rearward and downward from the head tube 3 provided at the front end portion thereof.

The steering unit 9 includes a steering stem 10 rotatably penetrating the head tube 3, steering handles 13 provided at an upper end of the steering stem 10, and a pair of left and right front fork tubes 11 coupled to the steering stem 10 and extending frontward and downward toward an axle 12a of the front wheel 12. Lower end portions of the pair of left and right front fork tubes 11 pivotally support the axle 12a of the front wheel 12 on left and right sides of the front wheel 12. Thus, the front wheel 12 is supported by the steering unit 9 in a steerable manner.

The engine 19 is appropriately attached via a hanger bracket or the like so as to be positioned on a lower side of the main frame 4. A driving force of the engine 19 is transmitted to the rear wheel 17 by a chain (not shown) bridged between a sprocket (not shown) provided on the engine 19 and a sprocket (not shown) provided on the rear wheel 17. Thereby, the straddle-type vehicle 1 is driven.

The double-sided swingarm 15 extends rearward from the main frame 4 toward an axle 17a of the rear wheel 17. The double-sided swingarm 15 is supported on the main frame 4 by pivot portions 15p provided at respective front end portions thereof and is swingable in the upper-lower direction on the pivot portions 15p. Rear end portions of the double-sided swingarm 15 pivotally support the axle 17a of the rear wheel 17 on left and right sides of the rear wheel 17. Thus, the rear wheel 17 is supported by the double-sided swingarm 15 and is swingable in the upper-lower direction.

The riding seat 18 is provided on an upper portion of the vehicle body frame 2. The riding seat 18 is configured such that a steerer and a passenger can be seated next to each other in a front-rear direction. A fuel tank 16 is provided in front of the riding seat 18.

The stays 20 are located on outer sides of the pair of left and right front fork tubes 11 in the vehicle width direction. Each stay 20 intersects with the steering stem 10 and the pair of left and right front fork tubes 11 in a side view. That is, the stay 20 is disposed such that a front end thereof is located in a position anterior to the steering stem 10 and the front fork tubes 11, and a rear end thereof is located in a position posterior to the steering stem 10 and the front fork tubes 11.

Accordingly, in the straddle-type vehicle 1, the storage boxes 30 can be attached to the outer sides of the pair of left and right front fork tubes 11 in the vehicle width direction. By attaching the storage boxes 30 to the outer sides of the pair of left and right front fork tubes 11 in the vehicle width direction, the storage boxes 30 can be disposed in a position anterior to a rider B of the straddle-type vehicle 1. Accordingly, the storage boxes 30 can reduce wind directly hitting the rider B during traveling of the straddle-type vehicle 1, and the storage boxes 30 are disposed at positions where objects stored in the storage boxes 30 can be easily accessed.

In the present embodiment, the stays 20 are disposed on both of the pair of left and right front fork tubes 11. Thus, in the straddle-type vehicle 1, the storage boxes 30 can be attached to the outer sides of both of the pair of left and right front fork tubes 11 in the vehicle width direction.

The stays 20 are disposed between the steering handles 13 and the front wheel 12 so as not to overlap the steering handles 13 and the front wheel 12 in a side view.

Accordingly, the stays 20 and the storage boxes 30 can be disposed at positions where, when the steering handles 13 are operated, the stays 20 and the storage boxes 30 do not interfere with operation of the steering handles 13 and the front wheel 12.

Each stay 20 is provided with a stay-side locking portion 21 that locks the storage box 30 in a detachable manner. The stay-side locking portion 21 includes a first stay-side locking portion 21a and a second stay-side locking portion 21b disposed behind the first stay-side locking portion 21a. The stay-side locking portion 21, that is, the first stay-side locking portion 21a and the second stay-side locking portion 21b, are disposed in a position posterior to the axle 12a of the front wheel 12.

Accordingly, since the storage box 30 is locked to the stay 20 in a position posterior to the axle 12a of the front wheel 12, when the storage box 30 is attached to the stay 20, a load applied to the axle 12a of the front wheel 12 can be reduced, and deterioration of operability of the steering handles 13 can be prevented.

The first stay-side locking portion 21a is, at least in part, disposed in a position anterior to the front fork tubes 11, and the second stay-side locking portion 21b is, at least in part, disposed in a position posterior to the front fork tubes 11.

Accordingly, the storage box 30 can be locked to the stay 20 in a plurality of positions, and a distance between the first stay-side locking portion 21a and the second stay-side locking portion 21b can be increased, so that the storage box 30 can be stably attached to the stay 20.

Figure 3:
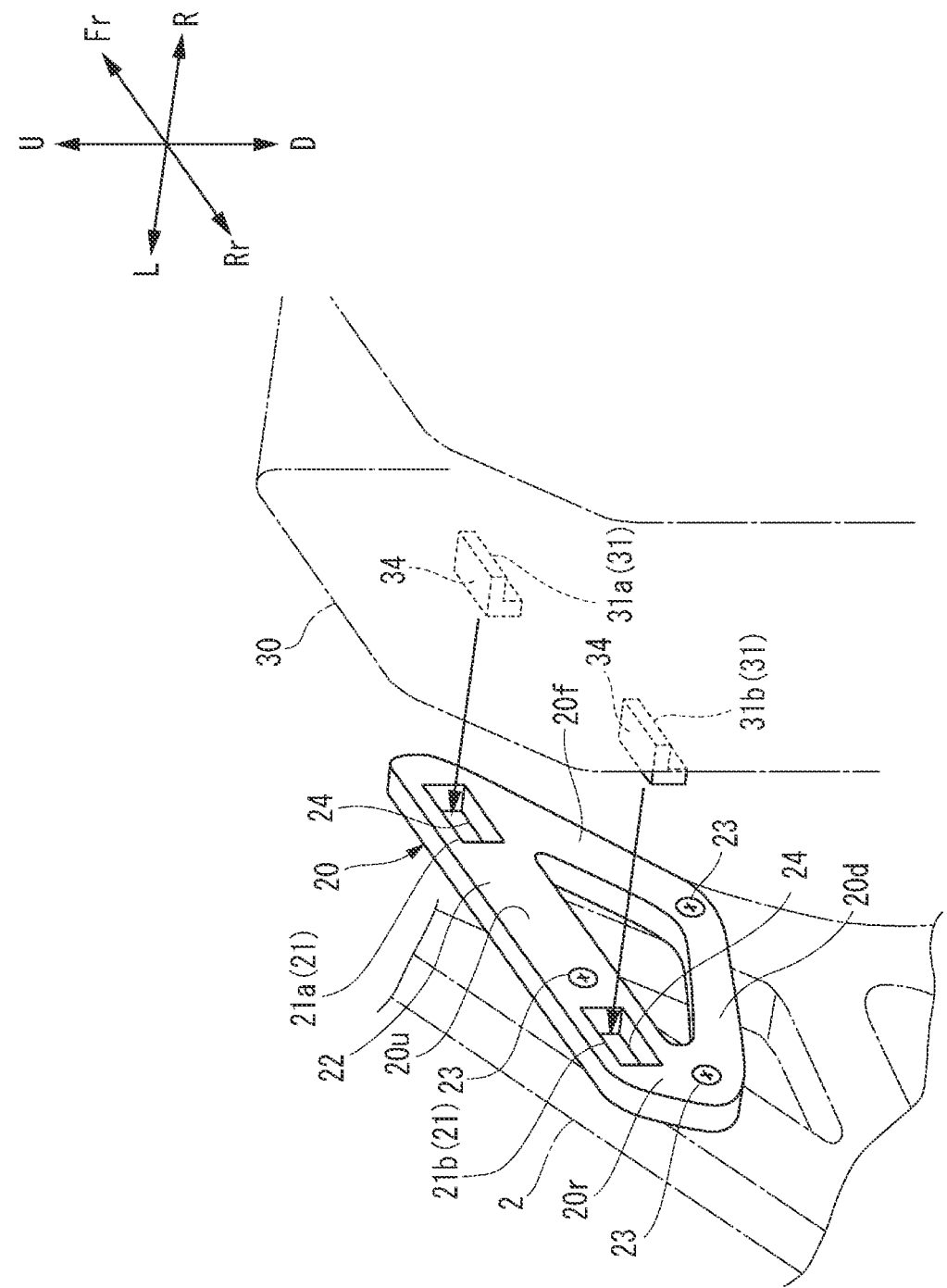
FIG. 3 is an enlarged perspective view of a stay on a right side in a vehicle width direction in a state in which a storage box disposed on the right side in the vehicle width direction shown in FIG. 1 is removed.

As shown in FIGS. 1 and 3, the stay 20 has a rectangular-frame shape in a side view. The stay 20 includes: a front upper frame portion 20u having a front end located in a position anterior to the front fork tubes 11 and a rear end located in a position posterior to the front fork tubes 11 in a state of being attached to the vehicle body frame 2, and extending rearward and upward from the front end to the rear end; a front lower frame portion 20f extending rearward and downward from the front end of the front upper frame portion 20u; a rear upper frame portion 20r extending rearward and downward from the rear end of the front upper frame portion 20u; and a rear lower frame portion 20d extending from a lower end of the front lower frame portion 20f to a lower end of the rear upper frame portion 20r.

The stay-side locking portions 21, that is, the first stay-side locking portion 21a and the second stay-side locking portion 21b, are provided on the front upper frame portion 20u of the stay 20. The first stay-side locking portion 21a is provided in a position anterior to a center of the front upper frame portion 20u in the front-rear direction, and the second stay-side locking portion 21b is provided in a position posterior to the center of the front upper frame portion 20u in the front-rear direction. Accordingly, the front upper frame portion 20u is provided with a connecting portion 22 that connects the first stay-side locking portion 21a and the second stay-side locking portion 21b.

As described above, since the connecting portion 22 that connects the first stay-side locking portion 21a and the second stay-side locking portion 21b is formed, it is possible to easily manufacture stays 20 in which only the distance between the first stay-side locking portion 21a and the second stay-side locking portion 21b is different. Accordingly, it is possible to easily manufacture stays 20 corresponding to storage boxes 30 of various sizes and shapes.

The first stay-side locking portion 21a and the second stay-side locking portion 21b are provided on the front side upper frame portion 20u extending rearward and upward from the front end to the rear end, and the first stay-side locking portion 21a is provided below the second stay-side locking portion 21b in the upper-lower direction.

Accordingly, the storage box 30 can be attached inclinedly to the straddle-type vehicle 1 so that a projected frontal area of the storage box 30 is reduced. Thus, air resistance can be reduced when the straddle-type vehicle 1 is travelling.

The stay 20 is fastened and fixed to the vehicle body frame 2 by a fastening member 23. In the present embodiment, the stay 20 is fastened and fixed to the vehicle body frame 2 by three fastening members 23. The fastening members 23 are respectively disposed at: a boundary portion between the front lower frame portion 20f and the rear lower frame portion 20d; a boundary portion between the rear upper frame portion 20r and the rear lower frame portion 20d; and a portion between the first stay-side locking portion 21a and the second stay-side locking portion 21b of the front upper frame portion 20u, that is, the connecting portion 22 of the front upper frame portion 20u.

Accordingly, since the stay 20 is fastened and fixed to the vehicle body frame 2 by the fastening member 23 on the connecting portion 22 of the front upper frame portion 20u, when the storage box 30 is attached to the stay 20, a load on the first stay-side locking portion 21a and the second stay-side locking portion 21b from the storage box 30 can be covered in a well-balanced manner by the fastening member 23 disposed on the connecting portion 22 of the front upper frame portion 20u, and the stay 20 can be more stably fixed to the vehicle body frame 2.

Figure 4:
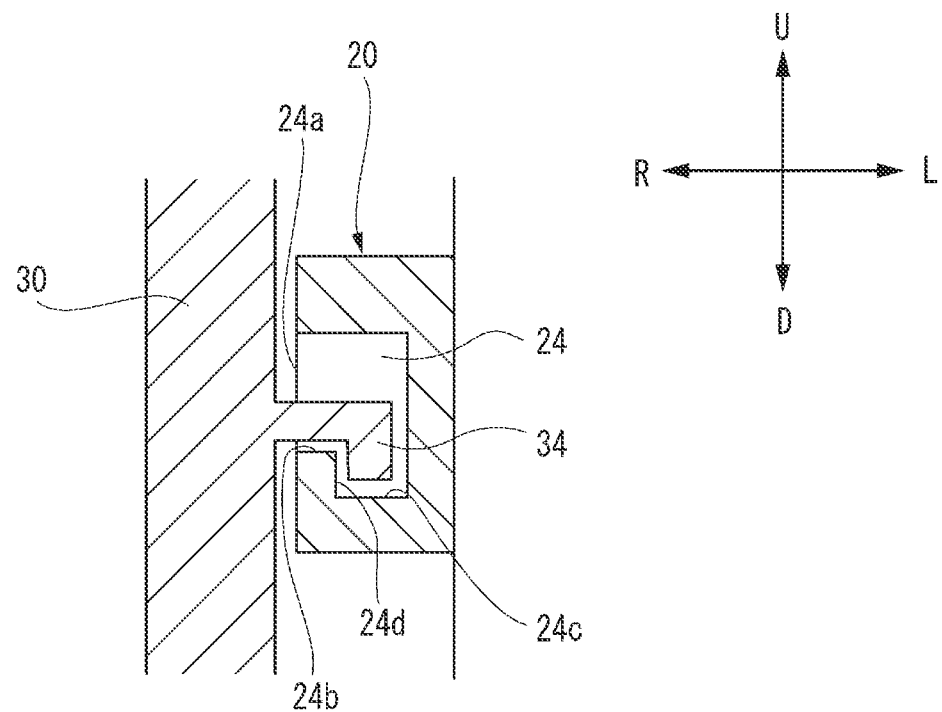
FIG. 4 is a cross-sectional view of a main part showing an engagement state between the storage box disposed on the right side in the vehicle width direction shown in FIG. 1 and the stay on the right side in the vehicle width direction.

As shown in FIGS. 3 and 4, the first stay-side locking portion 21a and the second stay-side locking portion 21b have substantially the same shape, and each are configured with a recess 24 that opens to a surface of the front upper frame portion 20u on the outer side in the vehicle width direction. In the recess 24, a lower end portion 24b of an opening 24a that opens to the surface of the front upper frame portion 20u on the outer side in the vehicle width direction is formed above a lower end surface 24c of the recess 24. That is, the lower end surface 24c of the recess 24 is further recessed downward from the lower end portion 24b of the opening 24a, and the recess 24 has a substantially L-shaped cross section when viewed in the front-rear direction.

The storage box 30 is provided with a storage box-side locking portion 31 that is locked to the stay-side locking portion 21. The storage box-side locking portion 31 is provided on a side surface of the storage box 30 on an inner side in the vehicle width direction. The storage box-side locking portion 31 includes a first storage box-side locking portion 31a locked to the first stay-side locking portion 21a of the stay-side locking portion 21 and a second storage box-side locking portion 31b locked to the second stay-side locking portion 21b of the stay-side locking portion 21.

The first storage box-side locking portion 31a and the second storage box-side locking portion 31b have substantially the same shape, and each have a protrusion 34 protruding inward in the vehicle width direction from the side surface of the storage box 30 on the inner side in the vehicle width direction. The protrusion 34 has a substantially L-shaped hook shape in which an end portion on the inner side in the vehicle width direction is bent downward.

Accordingly, when the protrusions 34 of the first storage box-side locking portion 31a and the second storage box-side locking portion 31b are inserted into the recesses 24 from the openings 24a of the first stay-side locking portion 21a and the second stay-side locking portion 21b, respectively, the storage box 30 is displaced downward due to its own weight, and the end portion of each protrusions 34 on the inner side in the vehicle width direction, which is bent downward, is hooked to a step surface 24d between the lower end portion 24b of the opening 24a of each recess 24 and the lower end surface 24c of the recess 24. Accordingly, the protrusions 34 of the first storage box-side locking portion 31a and the second storage box-side locking portion 31b of the storage box 30 are locked to the recesses 24 of the first stay-side locking portion 21a and the second stay-side locking portion 21b, respectively, and the storage box 30 is attached to the stay 20.

When the storage box 30 is to be detached from the stay 20, the storage box 30 is lifted and then moved outward in the vehicle width direction. Thereby, the protrusions 34 of the first storage box-side locking portion 31a and the second storage box-side locking portion 31b of the storage box 30 are released from the recesses 24 of the first stay-side locking portion 21a and the second stay-side locking portion 21b, respectively, and the storage box 30 is detached from the stay 20.

In this way, the storage box 30 is attached to the stay 20 in a detachable manner. Since the stay-side locking portion 21 is configured with the recesses 24 and the storage box 30 includes the storage box-side locking portion 31 having the protrusions 34, the storage box 30 can be easily attached to and detached from the stay 20.

Although the embodiment of the present invention has been described above, the present invention is not limited to the embodiment described above, and modifications, improvements, or the like can be made as appropriate.

For example, in the present embodiment, each stay 20 intersects with the steering stem 10 and the pair of left and right front fork tubes 11 in a side view, but the stay 20 is only required to intersect with at least one of the steering stem 10 or the pair of left and right front fork tubes 11 in a side view. That is, the stay 20 is only required to be disposed such that the front end thereof is located in a position anterior to at least one of the steering stem 10 or the front fork tubes 11, and the rear end thereof is located in a position posterior to at least one of the steering stem 10 or the front fork tubes 11. Thus, in the straddle-type vehicle 1, the storage boxes 30 can be attached to the outer sides of the pair of left and right front fork tubes 11 in the vehicle width direction.

For example, in the present embodiment, the stay 20 has a rectangular-frame shape including the front upper frame portion 20u, the front lower frame portion 20f, the rear upper frame portion 20r, and the rear lower frame portion 20d in a side view. However, the stay 20 is not limited to such shape.

The shapes of the stay-side locking portion 21 and the storage box-side locking portion 31 are not limited to the shapes described in the present embodiment, and can be changed as appropriate.

For example, in the present embodiment, the stay-side locking portion 21 and the storage box-side locking portion 31 include the first stay-side locking portion 21a and the second stay-side locking portion 21b arranged in line in the front-rear direction, and the first storage box-side locking portion 31a and the second storage box-side locking portion 31b arranged in line in the front-rear direction, respectively. However, each of the stay-side locking portion 21 and the storage box-side locking portion 31 may also be a single component elongated in the front-rear direction.

In addition, for example, the stay-side locking portion 21 is configured with the recesses 24 having a depth smaller than a thickness of the stay 20, but is not limited to such a structure. The stay-side locking portion 21 may also be a through hole penetrating the stay 20 in the vehicle width direction.

The present specification describes at least the following matters. Corresponding components in the above embodiment are shown in parentheses. However, the present invention is not limited thereto.

(1) A straddle-type vehicle (1) including a vehicle body frame (2) to which a steering unit (9) that supports a front wheel (12) in a steerable manner and a stay (20) to which a storage box (30) is configured to be attached are attached, in which the stay (20) is provided with a stay-side locking portion (21) configured to lock the storage box (30), the vehicle body frame (2) is provided with a head tube (3), the steering unit (9) includes a steering stem (10) rotatably penetrating the head tube (3), and a pair of left and right front fork tubes (11) coupled to the steering stem (10) and extending toward an axle (12a) of the front wheel (12), and the pair of left and right front fork tubes (11) pivotally supports the axle (12a) of the front wheel (12), in which the stay (20) is located on an outer side of the front fork tubes (11) in the vehicle width direction, and intersects with at least one of the steering stem (10) and the front fork tubes (11) in a side view.

According to (1), since the stay is located on the outer side of the pair of left and right front fork tubes in the vehicle width direction, the storage box can be attached to the outer sides of the pair of left and right front fork tubes in the vehicle width direction. By attaching the storage box to the outer sides of the pair of left and right front fork tubes in the vehicle width direction, the storage box can be disposed in a position anterior to a rider of the straddle-type vehicle. Accordingly, the storage box can reduce wind directly hitting the rider during traveling of the straddle-type vehicle, and the storage box is disposed in a position where objects stored in the storage box can be easily accessed.

(2) The straddle-type vehicle according to (1), in which
the steering unit includes a steering handle (steering handles 13) provided at an upper end of the steering stem, and
the stay is disposed between the steering handle and the front wheel so as not to overlap the steering handle and the front wheel in a side view.

According to (2), since the stay is disposed between the steering handle and the front wheel so as not to overlap the steering handle and the front wheel in a side view, the stay and the storage box can be disposed at positions where, when the steering handle is operated, the stay and the storage box do not interfere with operation of the steering handle and the front wheel.

(3) The straddle-type vehicle according to (1), in which the stay-side locking portion is disposed in a position posterior to the axle of the front wheel.

According to (3), since the stay-side locking portion is disposed in a position posterior to the axle of the front wheel, the storage box is locked to the stay in a position posterior the axle of the front wheel. Accordingly, when the storage box is attached to the stay, a load applied to the axle of the front wheel can be reduced, and deterioration of operability of the steering handle can be prevented.

(4) The straddle-type vehicle according to (3), in which the stay-side locking portion includes a first stay-side locking portion (first stay-side locking portion 21a) and a second stay-side locking portion (second stay-side locking portion 21b) disposed behind the first stay-side locking portion, and
the stay is provided with a connecting portion (connecting portion 22) that connects the first stay-side locking portion and the second stay-side locking portion.

According to (4), since the stay-side locking portion includes the first stay-side locking portion and the second stay-side locking portion disposed behind the first stay-side locking portion, the storage box can be locked to the stay in a plurality of positions, so that the storage box can be stably attached to the stay.

In addition, since the connecting portion that connects the first stay-side locking portion and the second stay-side locking portion is formed, it is possible to easily manufacture stays in which only the distance between the first stay-side locking portion and the second stay-side locking portion is different. Accordingly, it is possible to easily manufacture stays corresponding to storage boxes of various sizes and shapes.

(5) The straddle-type vehicle according to (4), in which the first stay-side locking portion is provided below the second stay-side locking portion in an upper-lower direction.

According to (5), since the first stay-side locking portion is provided below the second stay-side locking portion in an upper-lower direction, the storage box can be attached inclinedly to the straddle-type vehicle so that a projected frontal area of the storage box is reduced. Thus, air resistance can be reduced when the straddle-type vehicle is traveling.

(6) The straddle-type vehicle according to (1), in which the stay-side locking portion is configured with a recess (recesses 24), and
the storage box includes a storage box-side locking portion (storage box-side locking portion 31) having a protrusion (protrusions 34) and is attached to the stay in a detachable manner by locking the protrusion of the storage box-side locking portion to the recess of the stay-side locking portion.

According to (6), since the storage box is attached to the stay in a detachable manner by locking the protrusion of the storage box-side locking portion to the recess of the stay-side locking portion, the storage box can be easily attached to and detached from the stay.

What is claimed is:

1. A straddle vehicle comprising
a vehicle body frame to which a steering unit that supports a front wheel in a steerable manner and a stay to which a storage box is configured to be attached is attached,
wherein the stay is provided with a stay-side locking portion configured to lock the storage box, the vehicle body frame is provided with a head tube, the steering unit includes a steering stem rotatably penetrating the head tube, a steering handle provided at an upper end of the steering stem, and a pair of left and right front fork tubes coupled to the steering stem and extending toward an axle of the front wheel, and the pair of left and right front fork tubes pivotally supports the axle of the front wheel,
wherein the stay is located on an outer side of the front fork tubes in the vehicle width direction, and intersects with at least one of the steering stem and the front fork tubes in a side view, and
wherein the stay and the storage box are configured to be fixed, regardless of an operation of rotating the steering unit, to the vehicle body frame between the steering handle and the front wheel so as not to overlap the steering handle and the front wheel in a side view.

2. The straddle vehicle according to claim 1, wherein
the stay is disposed between the steering handle and the front wheel so as not to overlap the steering handle and the front wheel in a side view.

3. The straddle vehicle according to claim 1, wherein
the stay-side locking portion is disposed in a position posterior to the axle of the front wheel.

4. The straddle vehicle according to claim 3, wherein
the stay-side locking portion includes a first stay-side locking portion and a second stay-side locking portion disposed behind the first stay-side locking portion, and
the stay is provided with a connecting portion that connects the first stay-side locking portion and the second stay-side locking portion.

5. The straddle vehicle according to claim 4, wherein
the first stay-side locking portion is provided below the second stay-side locking portion in an upper-lower direction.

6. The straddle vehicle according to claim 1, wherein
the stay-side locking portion is configured with a recess, and
the storage box includes a storage box-side locking portion having a protrusion and is attached to the stay in a detachable manner by locking the protrusion of the storage box-side locking portion to the recess of the stay-side locking portion.

7. The straddle vehicle according to claim 1, wherein
the stay and the storage box are fixed to the vehicle body frame and do not rotate with an operation of rotating the steering unit.

* * * * *